Figure 1:
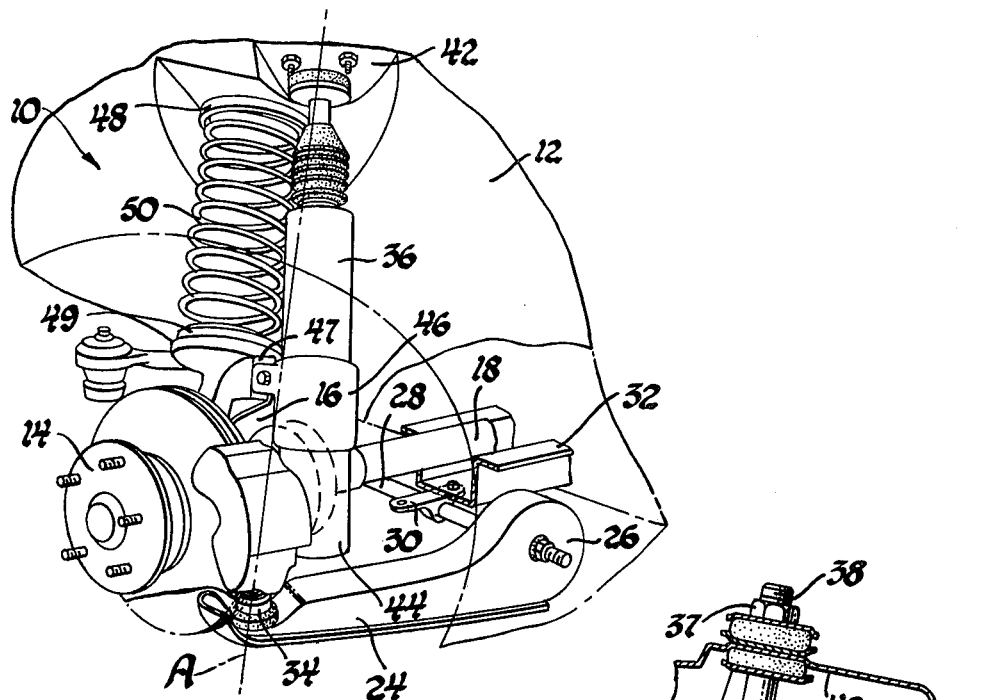

United States Patent [19]

Bodnar

[11] 4,065,152
[45] Dec. 27, 1977

[54] UNCOUPLED STRUT SUSPENSION SYSTEM

[75] Inventor: Alfred D. Bodnar, Pontiac, Mich.

[73] Assignee: General Motors Corporation, Detroit, Mich.

[21] Appl. No.: 713,373

[22] Filed: Aug. 11, 1976

[51] Int. Cl.² ............................................. B60K 17/30
[52] U.S. Cl. .................................. 280/668; 180/43 R
[58] Field of Search ........... 280/668; 180/43 R, 48 R, 180/42

[56] References Cited

U.S. PATENT DOCUMENTS 3,490,785 1/1970 Moss ..................................... 280/668
3,703,215 11/1972 Takahashi ......................... 180/43 R

FOREIGN PATENT DOCUMENTS 2,431,675 1/1976 Germany .............................. 280/668

Primary Examiner—Joseph F. Peters, Jr.
Assistant Examiner—Terrance L. Siemens
Attorney, Agent, or Firm—John P. Moran

[57] ABSTRACT

A strut-type suspension system for a front wheel drive vehicle, wherein the lower end of the shock absorber extends to a location either in front of or behind the drive axle and is secured to the steering knuckle, while the coil spring is mounted along side the strut with its lower end positioned substantially coincident with the kingpin axis and mounted either on the steering knuckle or on a bracket formed on the shock absorber. This arrangement provides a relatively low overall height, while minimizing bending moments across the shock absorber.

4 Claims, 2 Drawing Figures

UNCOUPLED STRUT SUSPENSION SYSTEM

This invention relates generally to vehicle suspension systems and, more particularly, to an uncoupled strut suspension system for use with a front wheel drive vehicle.

Heretofore, MacPherson type strut suspension systems have generally employed a shock absorber mounted on a steering knuckle, with a coil spring mounted either concentrically or eccentrically around the shock absorber or on some member other than the steering knuckle, such as the lower control arm. Such arrangements have required either a substantially high hood height, or that the lower end of the shock absorber be mounted either in front of or behind the axis of the wheel in order to have a lower overall height. Accordingly, an object of the invention is to provide an uncoupled MacPherson type suspension system arrangement wherein both the shock absorber and spring have their lower ends mounted on the steering knuckle with the lower end of the spring as near as possible to the kingpin axis.

Another object of the invention is to provide an uncoupled strut suspension system wherein both the shock absorber and spring have their lower ends mounted on the steering knuckle such that the lower end of the shock absorber is extended downwardly past the drive axle on one side or the other thereof for a lower overall strut height, but with the lower end of the spring mounted on or immediately adjacent the kingpin axis so as to minimize the bending moments across the shock absorber.

A further objecct of the invention is to provide an uncoupled strut-type suspension system for a front wheel drive vehicle having a frame supporting a body and a road wheel operatively connected to the frame, and including a laterally extending control arm having its inner end pivotally connected to the frame, a steering knuckle pivotally connected to the outer end of the control arm for rotatably supporting the wheel, a vertically oriented shock absorber having its lower end extended forward and adjacent or below the axis of the wheel, providing a low profile, and being secured to the steering knuckle, the upper end thereof being pivotally connected to the body at a point which together with the axis of the pivotal connection between the steering knuckle and the control arm defines a predetermined kingpin axis, an upper retainer bracket formed on the body adjacent the upper end of the shock absorber and a lower retainer bracket formed on the steering knuckle substantially coincident with the kingpin axis for minimizing bending moments across the shock absorber, and a vertically oriented coil spring mounted between the upper and lower retainer brackets.

Figure 2:
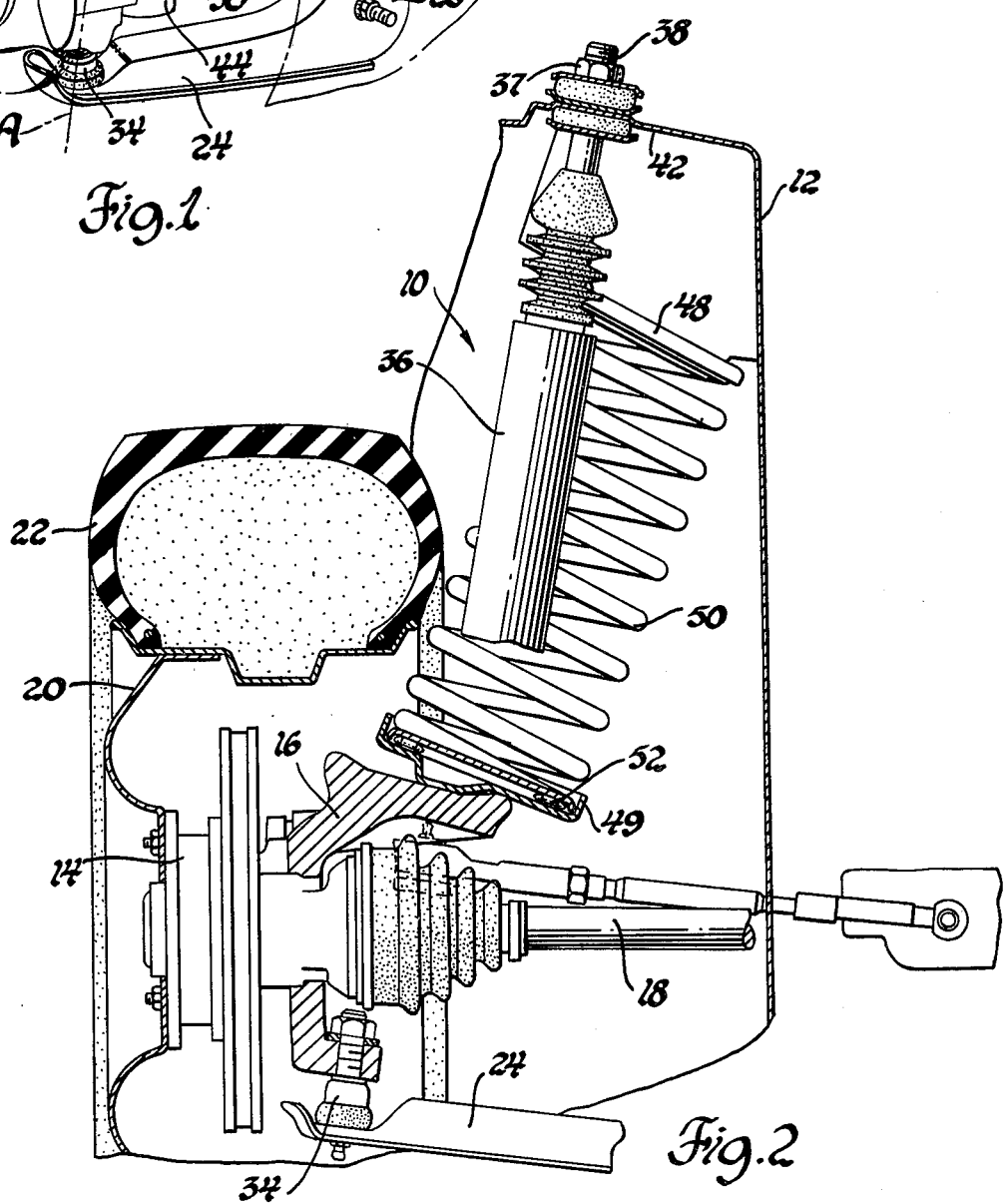

These and other objects and advantages of the invention will be apparent when reference is made to the following description and accompanying drawings. wherein:

FIG. 1 is a fragmentary perspective view of a vehicular front suspension system embodying the invention, and FIG. 2 is an enlarged fragmentary cross-sectional view of the inventive suspension system.

Referring now to the drawings in greater detail, FIGS. 1 and 2 illustrate a front suspension system 10 mounted between a vehicular body, represented at 12, and a wheel hub 14, the latter being rotatably mounted on a steering knuckle 16 operatively connected to a front wheel drive axle 18. A conventional wheel 20 and tire 22 are mounted on the hub 14.

The suspension system 10 includes a conventional wishbone type lower control arm 24 having its inner ends 26 pivotally mounted on a shaft 28 connected by brackets 30 to the frame or undercarriage 32 of the body 12 and its outer end connected via a ball joint 34 to the steering knuckle 16. A shock absorber 36 is secured via suitable fastener means 37 (FIG. 2) at its upper end 38 on an abutment surface 42 formed on the body 12, and adjacent its lower end 44 via a suitable clamp 46 to a side surface 47 formed on the steering knuckle 16. The lower end 44 of the shock absorber 36 is thus able to extend downwardly past the drive axle 18, either on the front or rear side thereof, permitting the upper surface 42 configuration to be at a minimal overall height. An upper retainer bracket 48 is mounted on the body 12 immediately adjacent the upper end 38 of the shock absorber 36. A lower retainer bracket 49 is formed either on the steering knuckle 16, or, if desired, on the shock absorber 36 or on its clamp 46. A coil spring 50 is confined between the upper and lower retainer brackets 48 and 49, respectively.

The kingpin axis A is thus defined by the pivotal connection of the upper end 38 of the shock absorber 36 with the body 12 and the pivotal ball joint 34 connection between the steering knuckle 16 and the outer end of the lower control arm 24. It is a feature of the invention that the center of the lower end of the spring 50 be mounted as near as possible to a point on the kingpin axis, in order to minimize the bending moments across the shock absorber 36.

Tests have indicated that the ends of the spring 50 will remain in place in the retainer brackets 48 and 49 during full inside and/or outside turns, despite the distortion of the spring 50 inherent in such turns. If desired for a particular vehicular model, suitable needle bearing means, represented at 52 in FIG. 2, may be mounted adjacent either end of the spring 50, within one of the retainer brackets 48 or 49.

It should be apparent that, with the above described arrangement, a low overall height of the shock absorber may be obtained, accommodating a low hood configuration, without a detrimental affect on the shock absorber being caused by a displaced coil spring.

It should also be apparent that the shock absorber may be slanted such that it extends either forward or rearward of the drive axle, with the lower end of the coil spring being disposed on or near the kingpin axis for optimum bending moment characteristics.

While but one general embodiment of the invention has been shown and described, other modifications thereof are possible.

What is claimed is:

1. A low profile, uncoupled strut suspension system for a motor vehicle having an undercarriage supporting a body, and a road wheel operatively connected to said undercarriage, said system comprising a laterally extending control arm having its inner end pivotally connected to said undercarriage, a steering knuckle pivotally connected to the outer end of said control arm for rotatably supporting said wheel, a vertically oriented shock absorber having its lower end extended adjacent and below the axis of said wheel and secured to said steering knuckle and its upper end pivotally connected to said body at a point which together with the axis of the pivotal connection between the steering knuckle and the control arm defines a predetermined kingpin axis, an upper retainer bracket formed on said body adjacent said upper end of said shock absorber and a lower retainer bracket formed on one of said steering knuckle and said shock absorber members substantially coincident with said kingpin axis for minimizing bending moments across said shock absorber, and a vertically oriented coil spring mounted between said upper and lower retainer brackets, said upper and lower retainer brackets serving to retain the respective ends of said coil spring during turning operations.

2. A low profile, uncoupled strut suspension system for a motor vehicle having a frame supporting a body, and a road wheel operatively connected to said frame, said system comprising a laterally extending control arm having its inner end pivotally connected to said frame, a steering knuckle pivotally connected to the outer end of said control arm for rotatably supporting said wheel, a vertically oriented shock absorber having its lower end extended forward and adjacent the axis of said wheel and secured to said steering knuckle and its upper end pivotally connected to said body at a point which together with the axis of the pivotal connection between the steering knuckle and the control arm defines a predetermined kingpin axis, an upper retainer bracket formed on said body adjacent said upper end of said shock absorber and a lower retainer bracket formed on said steering knuckle substantially coincident with said kingpin axis for minimizing bending moments across said shock absorber, bearing means mounted on one of said upper and lower retainer brackets, and a vertically oriented coil spring mounted between said bearing means and the other of said upper and lower retainer brackets.

3. A low profile, uncoupled strut suspension system for a motor vehicle having a frame supporting a body, and a drive axle, and a road wheel operatively connected to said drive axle, said system comprising a laterally extending control arm having its inner end pivotally connected to said frame, a steering knuckle pivotally connected to the outer end of said control arm for rotatably supporting said wheel, a vertically oriented shock absorber having its lower end extended forward and below the top of said drive axle and secured to said steering knuckle and its upper end pivotally connected to said body at a point which together with the axis of the pivotal connection between the steering knuckle and the control arm defines a predetermined kingpin axis, an upper bracket formed on said body adjacent said upper end of said shock absorber and a lower bracket formed on said steering knuckle substantially coincident with said kingpin axis for minimizing bending moments across said shock absorber, a vertically oriented coil spring mounted between said upper and lower brackets, and retention means formed on each of said upper and lower brackets for retaining the respective ends of said coil spring on said upper and lower brackets during turning operations.

4. An uncoupled strut suspension system for a motor vehicle having a frame supporting a body and a drive axle, and a road wheel operatively connected to said drive axle, said system comprising a laterally extending control arm having its inner end pivotally connected to said frame, a steering knuckle pivotally connected to the outer end of said control arm for rotatably supporting said wheel, a vertically oriented shock absorber having its lower end secured to said steering knuckle and extended forward and below the top of said drive axle, providing a low overall height, and its upper end pivotally connected to said body at a point which together with the axis of the pivotal connection between the steering knuckle and the control arm defines a predetermined kingpin axis, an upper bracket formed on said body adjacent said upper end of said shock absorber and a lower bracket formed on said steering knuckle substantially coincident with said kingpin axis for minimizing bending moments across said shock absorber, bearing means mounted on one of said upper and lower brackets, a vertically oriented coil spring mounted between said bearing means and the other of said upper and lower brackets, and retainer means formed on each of said upper and lower brackets for retaining said bearing means and the respective ends of said coil spring on said upper and lower brackets during turning operations.

* * * * *